United States Patent Office 3,453,131
Patented July 1, 1969

3,453,131
COMPOSITE COLLOIDAL PIGMENT PARTICLES, THEIR FORMATION AND SUSPENSIONS THEREOF
Thomas A. Fadner, Bethel, Maine, assignor to Oxford Paper Company, Rumford, Maine, a corporation of Maine
No Drawing. Filed Jan. 5, 1966, Ser. No. 518,768
Int. Cl. C09c 1/42; B01j 13/00
U.S. Cl. 106—308            8 Claims

ABSTRACT OF THE DISCLOSURE

Composite particles comprised of clay particles having a particle size in the range from about 0.5 to 3.0 microns to which there is adhered at least one chemical type of functional colloidal pigment particle having a particle size in the range of from about 0.01 to 1.0 microns and a negative electrical charge, said functional colloidal pigment particles being adhered to the clay particles by an aliphatic organic acid which acts as a coupling agent. The composite particles are formed in an aqueous suspension which may be used per se, or from which dried composite particles may be recovered.

---

This invention relates to composite colloidal particles and the method for making same. More particularly, this invention relates to the formation of composite particles by attaching one or more functional colloidal particle types to colloidal base or carrier particles by means of a coupling agent. Advantageously, the base or carrier colloidal particles are clay, the functional particles are, for example, carbon black, zinc oxide, titanium dioxide, sulfur or polystyrene and the coupling agent is a fatty acid. The composite particles so formed may be employed in various industrial commodities such as pressure sensitive transfer coatings, master batches for rubber compounding, cosmetic preparations, paint formulations, and wherever clay is useful as a carrier for another colloidal particle having a definite functionality such as coloration, chemical reactivity or physical utility in the commodity.

Dispersions of solid organic or inorganic particles in an aqueous medium are commonly employed by the chemical and allied industries to produce a wide variety of compositions for many different end uses. Generally, when particles are suspended in a liquid medium, they ultimately come out of suspension and settle to the bottom of the liquid. A number of common procedures are used to prevent this settling so that certain advantages ordinarily associated with the particulate form of the suspended material can be realized. Reducing the size of the particles to the colloidal range is one method of achieving this result. In addition, ionic emulsifying agents are generally employed to prevent or delay the settling out of the particles. Such agents migrate to the particle surfaces and become affixed such that the ionic portion of the surfactant is oriented in the aqueous phase. The resulting charge similarity on each particle tends to prevent close approach and recombination of the colloidal particles into aggregates that could settle out of suspension. These procedures are utilized in forming relatively stable colloidal suspensions of solid particles in liquid media in the manufacture of polishes, cleaners, floor waxes, paints, adhesives, and the like. Although these suspensions may contain two or more different types of particles, together with an emulsifying agent, said particles ordinarily exist in their original emulsified states, that is, each type of said particles is essentially unassociated or unattached to the other types of particles present in the dispersion. According to the present invention, a suspension of composite colloidal particles is formed whereby one type of colloidal particle is adhered to a second type of colloidal particle in a controlled manner, and these particles which are adhered together remain colloidally suspended in the liquid medium. By means of this invention, a suspension can be produced in which neither type of particle exists, independently of, or unassociated with, the other types of particle.

In one aspect of this invention, it has been found that the addition of an organic acid, such as a fatty acid, to an aqueous colloidal dispersion of a non-swelling clay and carbon black results in the formation of composite colloidal clay/carbon-black particles. The small carbon-black particles become adsorbed or affixed onto the larger clay particles by means of the organic acid. By properly employing the procedures of this invention, a colloidal suspension may be produced which is substantially devoid of any unaffixed clay or of any unaffixed carbon-black particles. Sulphur, titanium dioxide or emulsion polymer adhesive particles are also advantageously used as the functional colloidal particles according to this invention.

A preferred method of carrying out this invention comprises mixing a suspension of anisotropic, amphoteric base colloidal particles, having a net negative charge, with a suspension of functional colloidal particles also having a net negative charge, adding to said resulting admixture an organic acid coupling agent so as to cause adherence of the functional colloidal particles to the base particles.

Prior to addition of the coupling agent, the admixture exists as a stable suspension of two different colloidal particle types. Due to the charge similarity on all of the particles in the admixture virtually no interaction, coalescence, or adherence between or among the particles takes place except that which is normally encountered in colloidal suspensions, i.e., upon standing for weeks, months, or years, random agglomeration of particles will take place followed by a settling out of the agglomerates so formed. For practical purposes, such suspensions are considered in the art as stable. It is well known that coalescence or adherence of similar or dissimilar colloidal particles can be caused to take place by one of several methods, e.g., introduction of a chemical flocculating material that neutralizes the charges associated with the particles; addition of soluble ionizable salts such as sodium chloride to the suspension; heating the suspension to cause an increased number of particle collisions, thereby speeding up the inevitable coalescence process; freezing the suspension to promote coalescence. All of these procedures cause agglomeration of the particles by overcoming the mutual electrostatic repulsion between the similarly charged colloidal particles. In the absence of sufficient particle charge density or in the presence of an additional driving force, e.g., thermal energy, coalescence is allowed to take place more efficiently and as the coalesced particles increase in size, gravitational attraction pulls them out of the suspension. Practically useful colloidal suspensions are generally formulated in a manner which renders the particles least susceptible to these effects, since the advantageous form of the suspended material is that of discrete, small colloidal particles. It is also observed that the aforementioned coalescence methods are difficult to control and result in a random formation of coalesced particles that have little or no practical utility.

This invention provides for the preparation of a suspension of composite colloidal particles within an aqueous medium by controlled deposition of one class of colloidal particles, herein referred to as the functional colloidal particles, onto a second class of colloidal particles herein referred to as the base or carrier particles. According to this invention, there is believed to be no change in the chemical nature of the starting materials. The two types of starting materials are simply and preferentially attached to one another rather than to particles of their own kind by means of the coupling agent. Although the average size of the composite particles so formed is of necessity greater than that of the starting colloidal particles, the composite particles retain the general advantageous characteristics associated with colloidal materials.

The base colloidal particles which may be used are advantageously particles such as clay and clay-like particles. Outstanding results have been obtained with clays of the non-swelling platelet variety. The primary function of the clay is to act as a carrier for the functional colloidal particles. Normally, the platelet-type clay particles such as the water-washed kaolin variety impart a pH less than 7.0 when admixed with water, indicating their inherent acidic nature. However, the unmodified platelet clays are known to be capable of exhibiting properties characteristic of both positive (acidic) and of negative (alkaline) materials, the former being associated with the edges of the platelet particles and the latter with the platelet faces. This dual, or amphoteric, characteristic normally causes the formation of large flocs when the aqueous suspension of the clay is caused or allowed to be acidic, i.e., when the hydrogen ion concentration of the aqueous medium is greater than about $10^{-5}$ molar. This takes place because of intraparticle charge neutralization, primarily of edges to faces. Consequently, attempts to prepare aqueous kaolin clay suspensions by addition of the clay to water lead to thick, highly viscous mixtures at clay contents higher than about 20% by weight.

In practice, small percentages of dispersing agents, such as tetrasodiumpyrophosphate (TSPP), are added to an aqueous clay suspension in order to allow preparation of fluid dispersions containing as much as 60 to 70% clay. It is believed that negatively charged pyrophosphate ions in TSPP neutralizes and become affixed to the inherently positively charged edges of the clay particles. The overall charge of each clay particle is thereby rendered negative and mutual interparticle repulsion avoids floc formation, allowing up to 60 to 70% by weight of clay to be added before thickening of the suspension renders it impractical for normal industrial operations. Ammonium hydroxide functions in a similar but less effective manner at TSPP in forming fluid dispersions of kaolin clays. Only minimum amounts of TSPP or other chemically reactive type dispersing agents can be tolerated in order to practice the invention, since the amphoteric nature of the clay particles will have been destroyed. However, dispersants, such as ammonia, that are readily replaced by ion exchange with organic acid coupling agents, can be employed in virtually any quantity as a clay dispersant.

Although a platelet-type clay particle, for example, may naturally possess a neutral or acidic electric charge when mixed with water, the clay particle develops an overall net negative charge when dispersed with ammonium hydroxide. Despite the overall net negative particulate charge, the dispersed clay particles, it is believed, possess latent positive charges on the edges of the particle, the inherent negative charge on the flat portion of the particles remaining virtually unaffected. When an organic fatty acid is added to the colloidal clay suspension, the carboxylic group of the fatty acid would tend to be attracted to the edges of the clay particles, thereby leaving the hydrophobic portion of the fatty acid available to attract functional particles, such as carbon black, for instance, by physical adsorption.

The base particles to which the functional particles are attached are more generally described as electrically amphoteric particles. That is, the particles are capable of assuming different orientations and different diffusional directions in response to external electrical stimuli and are capable of assuming either a negative or positive charge on different portions of the individual particles. Preferably, these particles are anisotropic in nature, that is, they have a geometric configuration that allows a significant number of functional colloidal particles to become affixed, for instance, with platelet clays, on and near the thin edges of the platelets, and yet retain a significant surface area, i.e., the large flat faces of the particles, exposed or uncovered thereby allowing stabilizing interaction of the exposed areas with ions in the suspending medium.

Untreated kaolin clays, which are not calcined or subjected to processing that would disrupt their natural surface structure and electrical properties are advantageously employed in the method of this invention because they possess properties essential for base particles. The kaolin clays have large two-dimensional areas, i.e., are geometrically anisotropic platelets, thereby allowing attachment of many functional colloidal particles onto and near the edges of a single clay particle. Since the thin edges of the kaolin clay plates assume a positive charge in the presence of appropriate materials, e.g., an organic acid coupling agent, a charge neutralization by, and affixation of the negatively charged ionic coupling agent entities can take place without destroying the overall net negative charge of the clay particles necessary to stabilize the resulting composite colloidal particles.

Different grades of clays, having properties similar to that of kaolin clays, may be employed in the formation of composite particles including paper grade clays, termed "soft clays," such as HT Clay manufactured by the Edgar Clay Company, and a rubber grade clay termed "hard clays," such as the Huber Clay Company's "Suprex" clay.

The suspensions prepared according to this invention which contain composite colloidal particles are advantageously made up of from about 5 to 60% by weight of a non-swelling clay, preferably of the form existing originally as individual platelets in an aqueous suspension. The base particles are preferably large by comparison to the functional or colored colloidal particles, with the largest dimension of the clay particles being from about 0.5 to 3.0 microns.

The functional colloidal particles used according to this invention may be particles which in an aqueous colloidal suspension have a single type of electric charge associated with them and a particle size ranging from about 0.01 to about 1.0 micron. Anionic colloids are preferred, that is, colloidal systems in which the functional particles are associated with a suspending or emulsifying agent that imparts a net negative charge to each of the particles, or colloidal systems which have a natural negative charge when dispersed in water. Alternatively, functional colloidal systems may be used which are formulated with suspending agents that do not impart a residual electrical charge to the individual particles, i.e., non-ionic colloids. However, such materials are not intended to be the sole suspending agent. Less than about 10% by weight of such materials should be used since large quantities of these materials interfere with the desirable interaction of the colloidal particles with the coupling agent. Moreover, suspending agents which cause overall thickening or gelling should be avoided during composite particle formation. Such suspending agents interfere with the formation of discrete composite colloid particles.

It is desirable that the functional colloidal particles be smaller than the largest average dimension of the base colloid particles, e.g., from 1/100 to 1/10 of the size of the base particles, in order that a significant number of the functional particles can be attached to the base particles. However, composite particles can be prepared using functional colloids whose particles are about the same size as the base particles.

The functional particles should be electrically isotropic, that is, with their net electrical charge distributed approximately uniformly over the entire particle. This characteristic is not an absolute requisite, but is desirable. All of the functional particle types employed in multiple composite particle formation should be of a single charge type, preferably anionic.

The dispersant for the functional colloidal particles should be present in minimal amounts and should not be of a type that is so strongly adsorbed to the functional particles that it cannot be replaced by, or its function overcome by, the organic acid coupling agent. A typical type of dispersant for a variety of functional particles is the group of chemicals known as ligno-sulphonic acids, although other types of dispersants may be advantageously employed.

A variety of functional colloidal particles can be attached to the base colloidal particle by means of this invention. Table I identifies some of the functional colloidal particles that can be used according to this invention. The composite particles formed by employing these functional particles can be used advantageously in the preparation of practical systems listed in Table II.

with the latent positively charged clay edges and the nonionic (hydrocarbon) portion of the organic acid by attachment, or in some other manner becoming affixed to the functional colloid particle. The organic acid thereby operates as a coupling agent which firmly attaches the functional colloidal particles to the base colloidal particles.

The amount of organic acid required to cause the formation of the composite particles varies depending on both the amounts and the type of clay and functional particles employed. The amount of organic acid required for complete composite particle formation will vary between about 0.5% and 25.0% by weight based on the weight of base particles present in the system but normally will require less than about 5%. Generally, it is advantageous to employ slightly greater than the minimum

TABLE I.—IDENTIFICATION OF FUNCTIONAL COLLOIDAL PARTICLES

| Functional colloid | Manufactured by— | Description |
| --- | --- | --- |
| Aquablak B * | Columbian Carbon Co | Aqueous dispersion of channel black. Average particle diameter is 27 m$\mu$. |
| Aquablak M * | do | Aqueous dispersion of furnace black. Average particle diameter is 70 m$\mu$. |
| Titanox AWD * | Titanium Pigment Corp | Rutile form of titanium dioxide modified for water dispersibility. |
| TiPure PC * | E. I. du Pont & Co | Titanium dioxide, anatase form. |
| Lytron S-1 * | Monsanto Chemical Co | Polystyrene emulsion polymer particles at 46% solids. Particle average diameter 160 m$\mu$. |
| Mannox Blue * | Filo Color & Chemical Corp | Termed British Mannox Blue 39/SF/S. Used as 25-40% aqueous dispersion. |
| Zinc oxide | St. Joseph's Lead Co | Termed St. Joe 920. Used as 50% aqueous dispersion. |
| Iron oxide | C. K. Williams & Co | Magnetic iron oxide. Used as 15% ball-milled dispersion in 3/1 water/methanol. |
| Sulfur | Stauffer Chemical Co | Dispersed Sulfur 70. A 70% aqueous dispersion of sulfur. |
| Antimony oxide | Fisher Chemical Co | Used as 50% aqueous ball-milled dispersion. |
| Vazo | E. I. du Pont & Co | Vazo is Du Pont tradename for azobisisobutyronitrile. Used as 25% aqueous dispersion. |
| Methyl Zimate | R. T. Vanderbilt Co., Inc | Used as 30% aqueous ball-milled dispersion. |

* Trademark.

TABLE II.—TYPES AND USES OF FUNCTIONAL COLLOIDAL PARTICLES IN COMPOSITIE PARTICLE FORM

| Functional colloid | Functional property | End use |
| --- | --- | --- |
| Carbon Black | Colorant, electrical conductivity. | Toner, copy paper coating, paper colorant, latex paints, conductive coating or saturant. |
| Mannox Blue | Colorant | Toner, copy paper coating, paper colorant, latex paints. |
| Titanium dioxide | do | Whiting agent in paper coating, TiO$_2$ retention, latex paints. |
| Zinc oxide | Conductivity or photoconductivity, colorant, chemical reactivity. | Rubber articles, copy paper, whiting agent in paints or paper coatings. |
| Iron oxide | Colorant, magnetic properties. | Colored coatings, magnetic character recognition, magnetic tapes. |
| Sulfur | Chemical reactivity | Rubber vulcanizing agent, medicinal coating. |
| Antimony oxide | Fire retardant | Fire resistant fabrics, foams or paints, ablative coatings. |
| Polystyrene emulsion | Thermoplastic material | Heat or pressure deformable coatings, latex paints. |
| Azobisisobutyronitrile | Chemical or photochemical reactivity. | Polymerization initiator, blowing agent for rubber or plastic foams. |
| Methyl Zimate | Chemical reactivity | Accelerator for rubber vulcanizing. |

The organic acid coupling agent is advantageously an aliphatic carboxylic acid containing at least two carbon atoms and at least one ionizable carboxylic acid group. The various organic acids which may be used include acetic acid, valeric acid, stearic acid, succinic acid, adipic acid, and the like. The ammonium salt of the organic acid may also be used, and these salts provide results similar to those of the organic acid itself. The organic acid coupling agent appears to function in such a manner that the ionizable (carboxylic) portion of the organic acid becomes affixed to the base particle by association amount of coupling agent required to insure complete composite formation. The completeness of composite particle formation is tested in the following manner. The composite particle suspension is centrifuged in an International Clinical Centrifuge for periods ranging from 30 to 60 minutes and the centrifuged sample examined for homogeneity of the sediment, the relative volumes of the sediment and of the supernatant liquid, and for clarity of the supernatant liquid. Those samples which correspond to complete composite particle formation exhibit a homogeneous sediment, i.e., no differential layering or differential coloration is observed. The sediment is normally of considerably greater volume than that predicted by the densities of the component materials and greater than that exhibited by a simple mixture of the base and functional colloids, and a supernatant liquid layer free of any suspended colloidal material is observed. On the other hand, systems which are not completely composed of composite particles result in a sediment composed of two or more layers corresponding to the colloidal particle types present, or a supernatant liquid containing some or all of one of the colloidal components, or a combination of these conditions. For example, a clay/carbon black composite suspension prepared according to the methods of this invention exhibits a homogeneously black, soft, voluminous sediment and a clear supernatant liquid. A mixture of the same clay and carbon black colloidal dispersions untreated with a coupling agent as herein described exhibits a distinct, hard white layer and a soft black layer in the sediment, clearly corresponding to separate clay and carbon black layers, and a dense black, opaque supernatant liquid corresponding to a portion of the carbon black remaining in suspension.

The scientific factors governing the formation of composite particles according to this invention are not completely understood. It appears, however, that the organic acid coupling agent becomes physically adsorbed to or in some way interacts with the functional colloidal particles such that a substantial portion of the ionizable carboxylic acid groups of the organic acid are, in the absence of the base colloidal particles, oriented in the aqueous phase surrounding each of the individual functional particles. Since ionized carboxylic acid groups can readily be adsorbed onto the edges of the clay particles, presumably by charge neutralization or by chemical reaction with these positively charged edges of the clay particles, the functional colloidal particles carrying these carboxylic acid groups in turn become affixed to the clay.

In one form of this invention, separate suspensions of clay and of functional colloid are mixed in the desired proportion and an organic carboxylic acid is added to this mixture, thereby causing formation of these composite particles. Alternately, the organic acid coupling agent is added either to the clay suspension or to the functional colloidal particle suspension and this mixture is subsequently added to a suspension of the functional colloidal component.

One or more functional colloidal particles may be used, and one or more base colloidal particles may be used so as to form a variety of advantageous composite colloidal particle combinations. Once the suspension of colloidal composite particles is formed, the fluid medium supporting the suspension can be separated from the colloidal composite particles and such composite particles can be employed if desired in the dry state.

The resultant composite particles are stable, that is, under normal subsequent formulation and processing conditions, the particles tend to remain in the composite colloidal particle state, and can be used as a single type of particle having the combined properties of the component materials employed in preparing them. By way of illustration, the composite particles formed from clay and carbon black suspensions can be utilized directly in place of both the clay and carbon black particles in the preparation of pressure sensitive transfer coatings. Such coatings employing these clay/carbon black particles, rather than simple admixtures of separately dispersed clay and carbon black, exhibit greater resistance to incidental scuffing or rub-off at similar levels of transferability. This is due to the reduction in dirtiness of carbon black because of its having been affixed to the clay. Similar advantages are obtained in other end uses of the composite particles formed according to this invention.

The following examples will further illustrate the advantages of forming composite colloidal particles in accordance with the invention. Parts are given by weight. Viscosities were measured at room temperature with a Brookfield viscometer #3 spindle at 50 r.p.m.

Example 1

A suspension was prepared by mixing 17.5 parts of Aquablak B (carbon black at 35% solids) with 23.0 parts of water. To this suspension was added 20.6 parts of adipic acid (at 3% concentration). Then, to this suspension mixture was added 68.0 parts of an ammonia dispersed suspension of HT Clay (at 60% solids) which resulted in a composite suspension having a pH of 8.5, a viscosity of 790, and 36.8% solids.

The resulting suspension contained 15.0% by weight of carbon black and 1.5% by weight of organic acid, which percentages are based on the weight of the clay.

The composite suspension was centrifuged in an International Clinical Centrifuge for about one hour. The centrifugation test gave a soft, homogeneous pellet and a clear, supernatant liquid. The pellet volume was 12.5 ml. By comparison, a similar mixture prepared without addition of the organic acid coupling agent exhibited a pellet having a dark gray lower layer of 10 ml. volume with a soft black 1 ml. upper layer and black opaque supernatant liquid.

Example 2

A suspension was prepared by mixing 17.5 parts of Aquablak B (carbon black at 35% solids) with 23.0 parts of water. To this suspension was added 68.0 parts of an ammonia dispersed suspension of HT Clay (at 60% solids). To this mixture of suspensions was then added 20.6 parts of adipic acid (at 3% concentration) which resulted in a composite suspension having a pH of 7.9, a viscosity of 1130, and 36.8% solids. The suspension contained 15.0% of carbon black and 1.5% organic acid, which percentages are based on the weight of the component using the amount of clay contained as the base.

The composite suspension was centrifuged in an International Clinical Centrifuged for about one hour. The centrifugation gave a soft, homogeneous pellet and a clear, supernatant liquid. The pellet volume was 12.5 ml.

Example 3

A suspension was prepared by mixing 6.2 parts of Aquablak M (carbon black at 50% solids) with 7.7 parts of water. To this suspension was added 16.8 parts of adipic acid (at 1.9% concentration). Then, to this suspension mixture was added 34.3 parts of an ammonia dispersed suspension of HT Clay (at 60% solids).

The composite suspension was centrifuged for one hour. The centrifugation gave a soft, black, homogeneous pellet of 14.5 ml. and an essentially clear, supernatant liquid.

Example 4

The following table is illustrative of the nature and amounts of materials that can be employed according to this invention for the formation of composite particles as a result of deposition of functional colloidal materials other than carbon black onto clay. The process of Example 1 is used.

TABLE III

| Functional colloid | Weight percent functional colloid based on clay | Weight percent adipic acid based on clay | Nature of composite suspension | | Weight percent solids |
|---|---|---|---|---|---|
| | | | pH | Viscosity | |
| Zinc oxide | 30 | 0.56 | 9.6 | 540 | 25.4 |
| Iron oxide | 20 | 1.67 | 9.2 | 1,660 | 34.6 |
| Mannox Blue | 15 | 2.25 | 6.05 | 70 | 30.0 |
| Azobisisobutyronitrile | 17.4 | 1.94 | 9.3 | ---- | 42.0 |
| Methyl zimate | 30.0 | 3.0 | 9.2 | 320 | 30.6 |
| Sulfur | 20.0 | 2.0 | 7.2 | 224 | 32.3 |
| Titanium dioxide | 20.0 | 2.0 | 8.1 | 1,200 | 31.4 |
| Polystyrene | 20.0 | 2.0 | 6.4 | ---- | 31.3 |
| Zinc oxide | 12.5 | 1.0 | 9.45 | 1,340 | 30.0 |
| Sulfur | 6.25 | | | | |
| Methyl zimate | 6.25 | | | | |
| Antimony oxide | 19.8 | 15.2 | 8.85 | 3,000 | 35.1 |

Example 5

The following table relates to the types of organic acid and concentration thereof which can be used according to the invention. The method of Example 2 was used, except as indicated.

TABLE IV

| Organic acid | Weight percent acid based on carbon black | Weight percent acid based on clay | Weight percent carbon black based on clay | pH | Viscosity | Solids |
|---|---|---|---|---|---|---|
| Acetic | 9.9 | 2.48 | 24.0 | *9.2 | 172 | 25.8 |
| Valeric | 16.5 | 4.0 | 24.0 | 9.2 | 126 | 25.0 |
| Adipic | 16.0 | 0.8 | 5.0 | 9.2 | 66 | 29.2 |
| Do | 16.0 | 1.6 | 10.0 | | | 30.7 |
| Do | 15.7 | 2.34 | 14.3 | | | 25.4 |
| Do | 10.0 | 2.0 | 20.0 | *8.9 | 200 | 30.0 |

*Organic acid employed as the ammonium salt.

In all the above examples, the formation of composite particles in either complete or at least substantially complete as demonstrated by a clear supernant liquid and a homogeneous pellet obtained in the centrifuge testing.

In the foregoing examples of the invention, the functional colloidal particles become firmly attached to the clay particles by means of an organic acid coupling agent which, in turn, is adsorbed by the functional colloidal particle. In general, the method of this invention is applicable to the formation of various composite particles by deposition of functional colloidal particles onto the base colloidal or clay particle by means of a coupling agent.

Composite particle suspensions according to this invention can be used in a variety of commercial formulations, for instance, as indicated in Table II. Alternately, the composite particles can be separated from the aqueous medium, for instance, by freeze-drying or by spray-drying and utilized subsequently in formulating aqueous, non-aqueous or non-liquid composition.

I claim:

1. Composite particles colloidally suspended in an aqueous medium wherein the composite particles are comprised of clay particles having a particle size in the range from about 0.5 to 3.0 microns to which there is adhered at least one chemical type of non-amphoteric functional colloidal pigment particle having a particle size in the range from about 0.01 to 1.0 micron and a negative electrical charge, said functional colloidal pigment particles being adhered to the clay particles by means of an aliphatic organic acid, said aliphatic organic acid being a coupling agent.

2. The composition of claim 1 in which the clay particles are non-swelling, platelet clay particles.

3. The composition of claim 1 in which the non-amphoteric functional pigment particles are anionic colloidal dispersions of either carbon black, acetylene black, iron oxide, Mannox blue, azobisisobutyronitrile, zinc oxide, methyl zimate, sulfur, titanium dioxide, polystyrene, or antimony oxide or mixtures thereof.

4. Dried composite particles of claim 1.

5. The method of forming composite colloidal particles in an aqueous suspension which comprises forming an admixture of (a) a suspension of base colloidal clay particles having a particle size in the range from about 0.5 to 3.0 microns and possessing a net negative electrical charge, (b) a suspension or dispersion of functional colloidal pigment particles having a particle size in the range from about 0.01 to 1.0 micron and a net negative electrical charge, and (c) from about 0.5 to 25.0 weight percent, relative to the base particle weight, of an aliphatic organic acid, said aliphatic organic acid being a coupling agent, and absorbing said aliphatic organic acid on mixing the composite said colloidal particles by suspension for a sufficient time to form the composite colloidal particles.

6. The method of claim 5 in which the clay particles are non-swelling, platelet clay particles.

7. The method of claim 5 in which the non-amphoteric functional pigment particles are anionic colloidal dispersions of either carbon black, acetylene black, iron oxide, Mannox blue, azobisisobutyronitrile, zinc oxide, methyl zimate, sulfur, titanium dioxide, polystyrene, or antimony oxide or mixtures thereof.

8. The method of forming composite colloidal particles which comprises forming an admixture of (a) a suspension of base clay particles having a particle size in the range from about 0.5 to 3.0 microns and possessing a net negative electrical charge, (b) a suspension or dispersion of functional colloidal pigment particles having a particle size in the range from about 0.01 to 1.0 micron and a net negative electrical charge, and (c) from about 0.5 to 25 weight percent, relative to the base particle weight, of an aliphatic organic acid, said aliphatic organic acid beng a coupling agent, and mixing the composite suspension for a sufficient time to form the composite colloidal particles, and thereafter drying said colloidal particles.

References Cited

UNITED STATES PATENTS 2,068,066  1/1937  O'Brien.
2,113,539  4/1938  Meister.

RICHARD D. LOVERING, *Primary Examiner.*

U.S. Cl. X.R.

106—288, 296, 300, 303, 304, 307; 117—100; 252—313

UNITED STATES PATENT OFFICE
CERTIFICATE OF CORRECTION

Patent No. 3,453,131                                                                July 1, 1969

Thomas A. Fadner

It is certified that error appears in the above identified patent and that said Letters Patent are hereby corrected as shown below:

Column 9, line 53, after "agent" insert -- for the composite particle --. Column 10, lines 19 and 20, "agent, and absorbing said aliphatic organic acid on mixing the composite said colloidal particles by suspension" should read -- agent, and adsorbing said aliphatic organic acid on said colloidal particles by mixing the composite suspension --; line 41, "beng" should read -- being --.

Signed and sealed this 31st day of March 1970.

(SEAL)
Attest:

EDWARD M. FLETCHER, JR.                          WILLIAM E. SCHUYLER, JR.
Attesting Officer                                     Commissioner of Patents